(12) United States Patent
Nagy

(10) Patent No.: US 6,343,148 B2
(45) Date of Patent: *Jan. 29, 2002

(54) PROCESS FOR UTILIZING EXTERNAL HANDWRITING RECOGNITION FOR PERSONAL DATA ASSISTANTS

(75) Inventor: William Arpad Nagy, New York, NY (US)

(73) Assignee: International Business Machines Corporation, Armonk, NY (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/120,538

(22) Filed: Jul. 22, 1998

(51) Int. Cl.[7] .................................................. G06K 9/18
(52) U.S. Cl. ...................................... 382/187; 382/193
(58) Field of Search ................................ 382/187, 184, 382/185, 186, 188, 189, 209, 193, 194, 198, 200, 211, 216, 217; 712/219

(56) References Cited

U.S. PATENT DOCUMENTS 5,454,046 A * 9/1995 Carman, II ................. 382/186
5,598,534 A * 1/1997 Hass ............................ 712/219
5,687,254 A * 11/1997 Poon et al. .................. 382/229
5,889,506 A * 3/1999 Lopresti et al. ............. 345/158
5,953,541 A * 9/1999 King et al. .................. 395/887

* cited by examiner

Primary Examiner—Andrew W. Johns
Assistant Examiner—Seyed Azarian
(74) Attorney, Agent, or Firm—McGuireWoods, LLP; Stephen C. Kaufman

(57) ABSTRACT

A personal data assistant (PDA) that effectively uses human handwriting as input is disclosed. The PDA takes advantage of the fact that a significant portion of the data which is entered into a PDA is not time-critical and can, therefore, remain in handwritten form for some period of time. The recorded information is transmitted from the user's input to an external device for processing. After the translation occurs, the data can be passed back to the PDA storage and/or processing within an application on the PDA. When using the PDA, the user would enter notes on the pad either free form or in an application specific form. The handwritten data collected by the PDA may then be transferred to a recognition engine. This recognition engine may be remote and connected via wireless modem. The transfer may be done in real time or later.

44 Claims, 6 Drawing Sheets

PROCESS FOR UTILIZING EXTERNAL HANDWRITING RECOGNITION FOR PERSONAL DATA ASSISTANTS

BACKGROUND OF THE INVENTION

1. Field of the Invention

The present invention generally relates to personal digital assistants and, more particularly, to processing handwritten input using a handwriting recognition engine.

2. Background Description

The current limitations of most Personal Digital Assistants (PDAs), especially in the areas of processing power and storage, prohibit them from effectively utilizing natural human handwriting as a means of input. In order to provide good results, handwriting recognition engines need a significant amount of processing power and storage to perform their job. Several technologies, such as the one upon which the Apple Newton PDA is based, have attempted to integrate handwriting recognition engines into PDAs, but their usability has been limited and has come at great monetary cost. Other PDAs have taken a different approach to scripted user input, namely the user of discrete meta-language. By carefully designing the meta-language, and forcing the user to input it into a small, well-defined area on the device, accuracy rates for interpretation can be significantly increased while keeping the computation costs low. However, this type of input system is unnatural to use and requires that the user be trained on the system.

SUMMARY OF THE INVENTION

It is therefore an object of the present invention to provide a process for a personal data assistant device which effectively uses human handwriting as a means of input.

By taking advantage of the fact that a significant portion of the data which is entered into a PDA is not time-critical (i.e., it does not require a millisecond response) and can, therefore, remain in handwritten form for some period of time, we can choose to transmit the recorded information from the user's input to an external device for processing and bypass the limitations which exist for this type of interpretation on the PDA itself. After the translation occurs, the data can be passed back to the PDA for storage and/or processing within an application on the PDA.

When using the PDA, the user would enter notes on the pad either free form or in an application specific form. The handwritten data collected by the PDA may then be transferred to a recognition engine. This recognition engine may be remote and connected via wireless modem. The transfer may be done in real time or later.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1A:
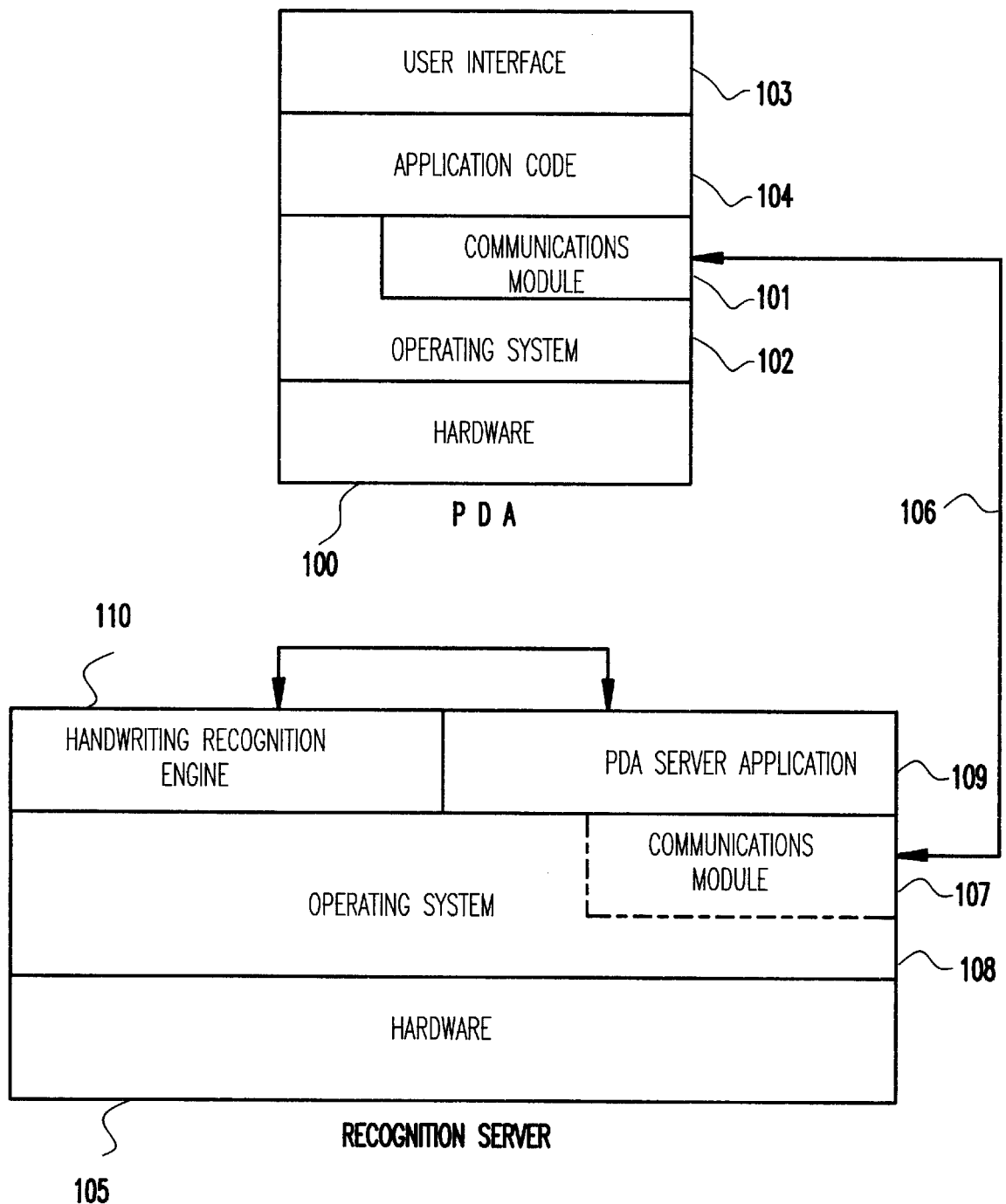
FIGS. 1A, 1B, and 1C are block diagrams of components of a personal data assistant showing its connection to a recognition engine.
Figure 1B:
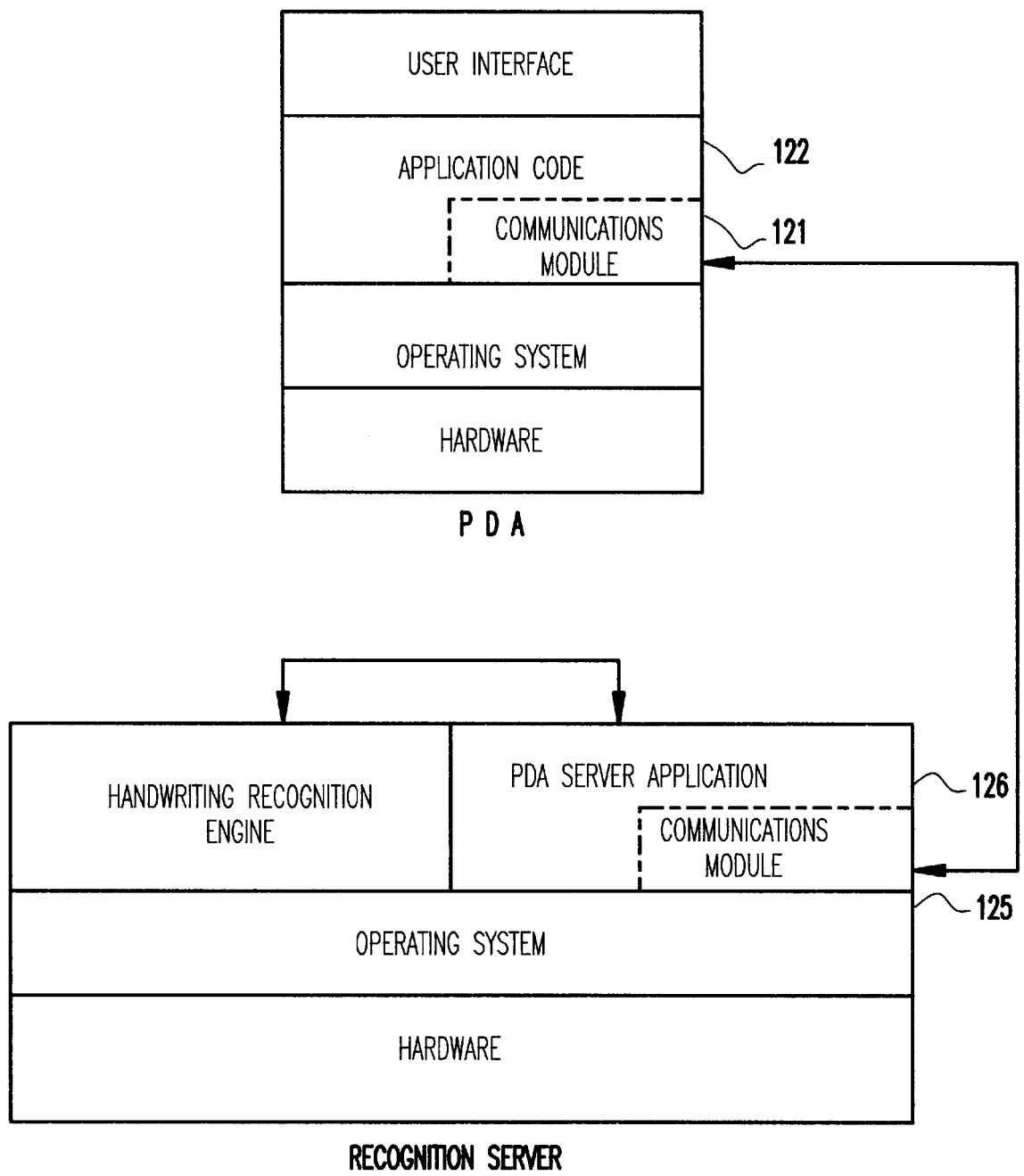
Figure 1C:
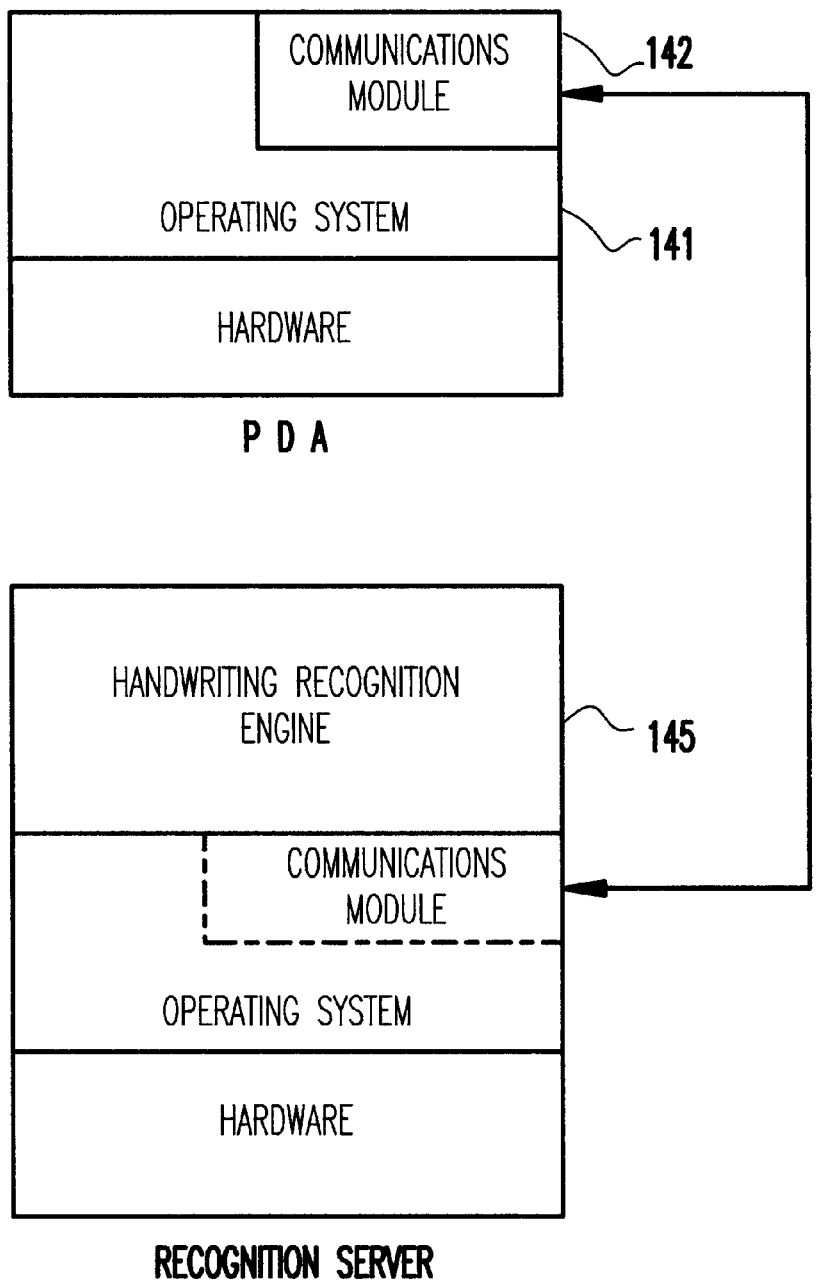

Referring now to the drawings, and more particularly to FIGS. 1A through 1C, there is shown a block diagrams of PDA components and its connection to a recognition engine. These figures demonstrate different ways of layering the components of the system from a software/hardware perspective, as well as the flow of communication between them. Each of the different pieces (the PDA system and the Recognition Server) on the separate components can be combined interchangeably. While these block diagrams represent the more common versions of architecture, they are not exhaustive of possible architectures.

In FIG. 1A, there is shown a PDA 100 which communicates with a recognition server 105 via a link 106 connected between a communications module 101 in the PDA and a communications module 107 in the recognition module. The link 106 may be a connected cable or wire or, in the preferred embodiment, a wireless link, such as an infrared (IR) link. In the illustrated architecture, the communications module 101 is built directly into the PDA's operating system (OS) 102, either as an add on driver or initially. The PDA application presents the user with an interface 103 through which to communicate. The application code 104 determines what data should be passed through to the recognition engine and when the data should be passed, and then invokes the correct calls to the PDA's operating system 102. The PDA's operating system 102 communicates with the recognition server through appropriate communications modules 101, 107. The communication module 101 is responsible for making calls into the operating system 102 to send/receive data, but does not have to know over what device it is communicating. With this type of design, it is also possible that all of the knowledge of handwriting translation interactions takes place within the operating system. This means that the application simply tells the operating system that this field represents handwriting data, and that the operating system should ship off the data when necessary, and hand back the translated version when it receives it.

In a manner similar to the PDA, the communications module 107 for the recognition server 105 is built directly into the operating system 108. The PDA server application 109 interacts with the operating system 108 to receive and send data to the PDA communications module 101. In order to translate the data, the server application 109 must interact with the handwriting recognition engine 110 through some communication mechanism (shared memory, pipes, network communication, etc.) In fact, the engine could operate on a completely separate machine from the PDA server application.

The communications module 107 within the server operating system 108 receives the incoming data, and passes it up to the PDA server application 109 which processes the data, and extracts the information to be given to the recognition engine 110. The PDA server application 109 then communicates the translation request to the recognition engine 110. The engine 110 then processes the data and passes it back through the chain in reverse order. The only requirement of the recognition engine 110 is that it be able to respond to input from something other than a physical device (mouse/pen/etc.), that it be able to respond with the translated information.

FIG. 1B illustrates the situation which would most likely occur in an already designed/deployed PDA. The communications module 121 is placed in the application layer 122. As a result, the underlying PDA does not have to know anything about handwriting or this process. For the recognition server, the communications module 125 is placed in the applications layer 126 as well, although most common operating systems have some communication system built in.

FIG. 1C illustrates the architecture of a PDA with a single purpose. As illustrated here, the application (not shown) would most likely be integrated into the operating system layer 141, along with the communications module 142. In the recognition server, the same could be done for the handwriting recognition engine 145. If the engine understands this process, then the intermediate PDA server application can be removed.

Figure 2:
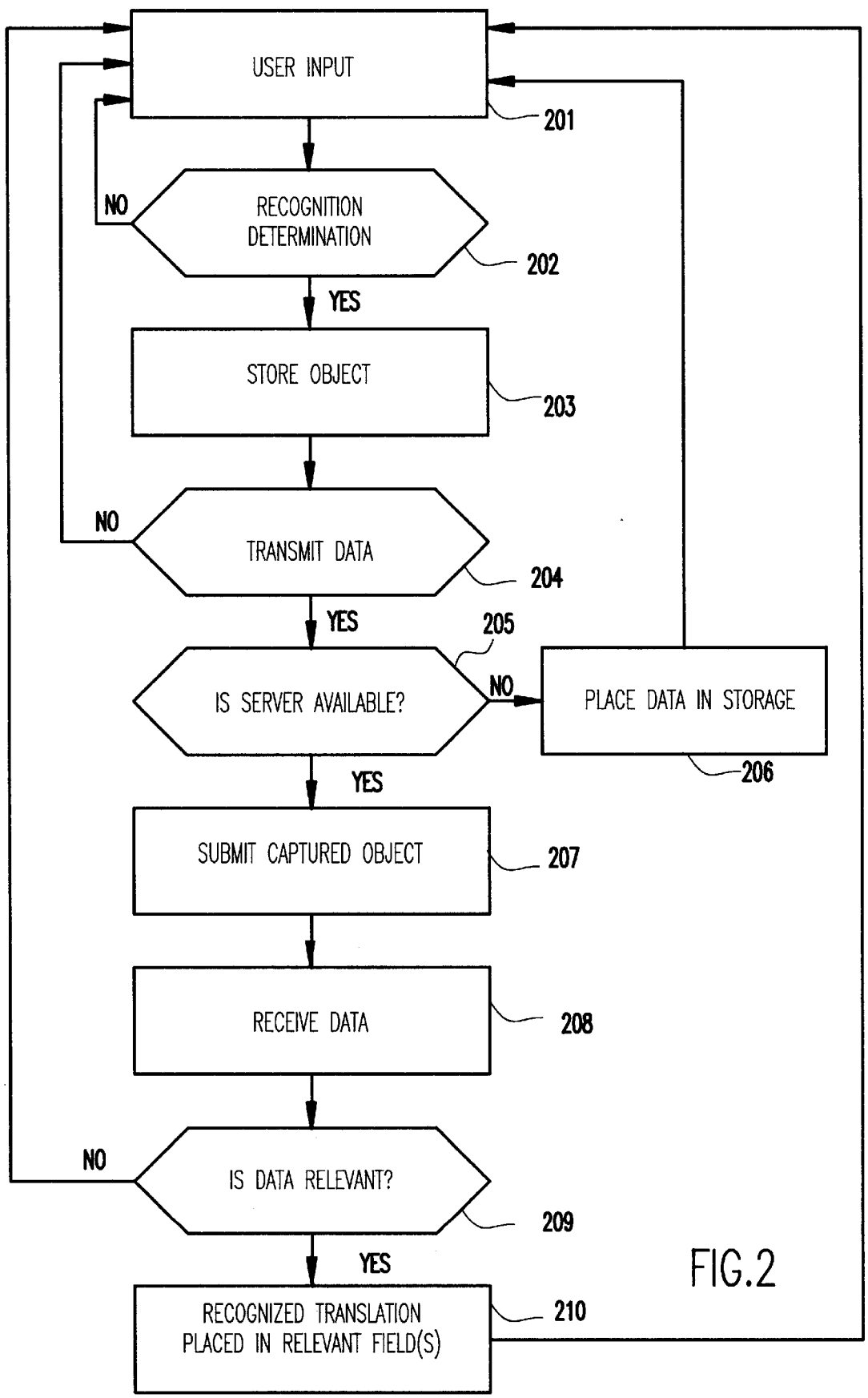
FIG. 2 is a flow chart showing the steps of the process flow for one embodiment of the personal data assistant.
Figure 3A:
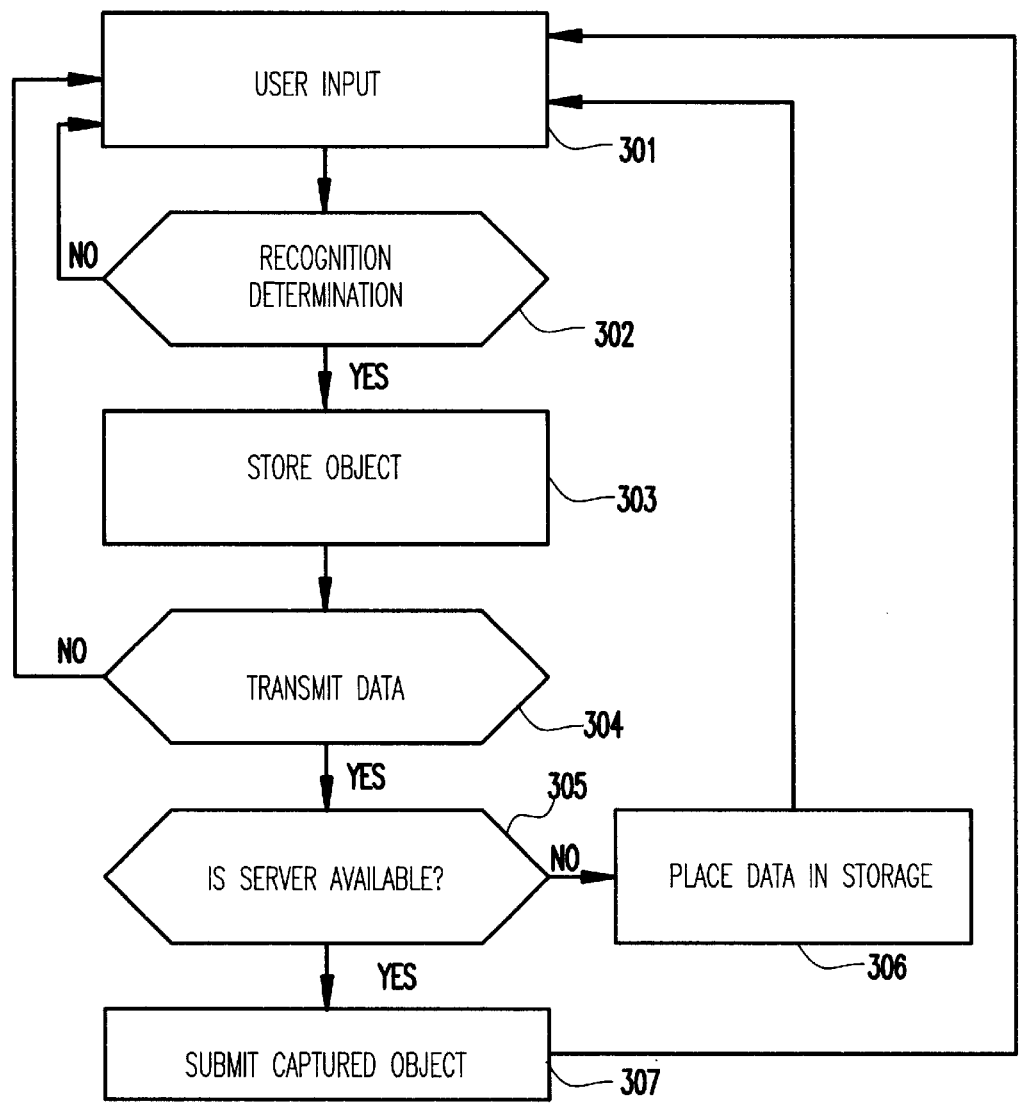
FIGS. 3A and 3B are flow charts showing the steps of the process flow for another embodiment of the personal data assistant.
Figure 3B:
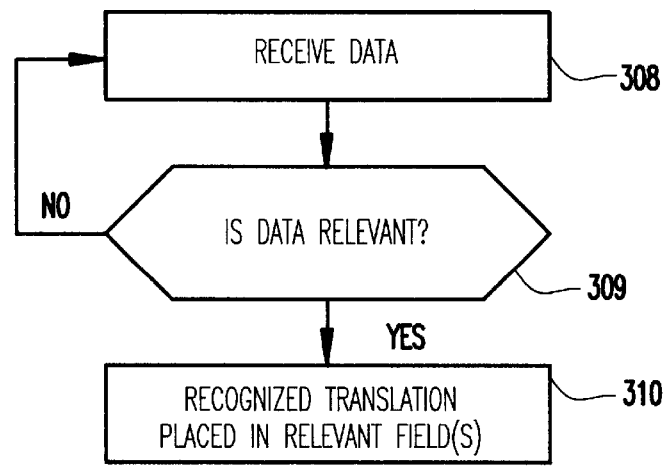

FIGS. 2, 3A and 3B represent the process flow of the invention for the operation of the PDA.

In FIG. 2, there is shown a flow chart of the inventive process when it is used in a synchronous fashion. In this process, the application does not proceed until translated data is returned. As shown in the step in block 201, the user inputs data first. Then, as shown in the step in block 202, a determination is made as to whether a required minimum amount of data has been input for recognition. Depending on the recognition engine used, this could be a single handwriting stroke or as much as a character or word. If not enough data has been received, then the process loops back to accept more data.

If enough data is received, then the next step is shown in block 203 where the captured object is stored. The data stored is highly dependent upon the recognition engine chosen, as well as the PDA application itself. Typically, starting x, y coordinates is stored along with glyph information, to determine spacing between characters.

Other information may also be passed on as hints to the recognition engine. This other information would be application specific and most likely programmed into the PDA prior to use, although some may also be derived at run time. For example a PDA used by police officers at a crime scene may have a form to be completed or a series of questions to be answered. There may be a code which lets the PDA transmit to the recognition engine that a series will be numeric, consist of names, addresses, or phone numbers. There may be a code to identify an entry as a prescription drug or chemical formula so that a combination of numbers, letters, dashes and commas will not be translated into an unrelated word. It is also most likely necessary to store information about the location in the application where the data was entered, so that when the interpreted data is passed back from the engine, it can be placed in its proper location (e.g., in the form supplied by the application).

Next, as shown in the step in block 204, a determination is made whether to transmit data. This decision is based mainly upon the fact of whether or not the PDA can/wishes to talk to the recognition engine, although other factors may influence this decision as well. This process supports both connected and disconnected modes of operation. Connected mode could be achieved by using a wireless transport device (cellular modem, wireless LAN, infrared, etc.) or a wired conduit (serial cable, etc.) to communicate with the recognition engine in pseudo-real-time, with the engine returning the translated data (if desired) as it is processed. The preferred method of operation would be the disconnected mode, whereby the PDA could store the data until it is connected to the recognition engine (either via wired or wireless link) at which time operation would resume as if in connected mode.

Following the determination to transmit data, a determination is made as to whether the server is available as, shown in the step in block 205. If the server is not available, data is placed in storage as shown in the step in block 206. After being placed in storage, the process returns to the starting step 201.

If the server is available, then, as shown in the step in block 207, the captured object is submitted to the recognition engine. The application probably will want to keep the original user input (glyphs), so that when the translated data is returned, the user can fix any errors by examining the input by hand.

Then, as shown in the step in block 208, the PDA receives the data. Next, as shown in the step in block 209, a determination of the relevance of the data is made. One factor in this determination is whether the record to which the data belongs still exists and whether that record has been modified since the data was last submitted for recognition. If the data is determined not to be relevant it is discarded and the process loops back to the input block 201.

Finally, as shown in the step in block 210, the recognized translation is placed in relevant fields displayed in the user interface so that the user may see the translated object data and make any necessary corrections. After this step is complete, the process loops to the beginning to wait for user input.

In FIGS. 3A and 3B there is shown flow charts of the inventive process when it is implemented in an asynchronous fashion. Here, the process has been broken into two "threads" of execution, one, shown in FIG. 3A, which handles submissions to the server, and one, shown in FIG. 3B, which receives responses from the server. It is enough just to ship the data to the recognition server and continue accepting user input (a separate "thread", could then be waiting for translated data). If the application wants to wait for the translated data, then it may do so. The steps of the submission thread shown in FIG. 3A are the same as those shown in FIG. 2 up to the step shown in block 307, where the captured object is submitted. Following, this step, the process returns to the first shown in block 301 to wait for user input.

More specifically, in the step in block 301, the user inputs data first. Then, as shown in the step in block 302, a determination is made as to whether a required minimum amount of data has been input for recognition. If so, the object is stored in the step shown in block 303. Then, a determination is made in the step shown in block 304 as to whether to transmit data. If so, a further determination is made in the step shown in block 304 as to whether the server is available and, if not, the data is placed in storage in the step shown in block 306; otherwise, the captured data is submitted to the recognition server in the step shown in block 307, and the process loops back to input block 301 to await further user input.

In the receiving thread, shown in FIG. 3B, the steps are analogous to those shown in the steps shown in blocks 208 to 210 of FIG. 2. Upon receiving data, the handwriting recognition engine begins working, as shown in the block in step 308. This is an unspecified entity, but to be useful it must be able to translate from handwritten glyphs to a character language that can be used on the PDA, with some degree of accuracy. Data is communicated to and from the recognition engine by an unspecified protocol. The received data is processed to determine if the data is relevant in the step shown in block 309 and, if not relevant, the data is discarded and the process loops back to block 308 to await further data from the recognition server. If the received data is determined to be relevant, the recognized translation is placed in relevant field(s) in the step shown in block 310 before the process loops back to block 308.

Part of the communication code executed on the PDA but may be in a separate thread of execution from the original input processing code if we are operating in an asynchronous fashion.

Figure 4:
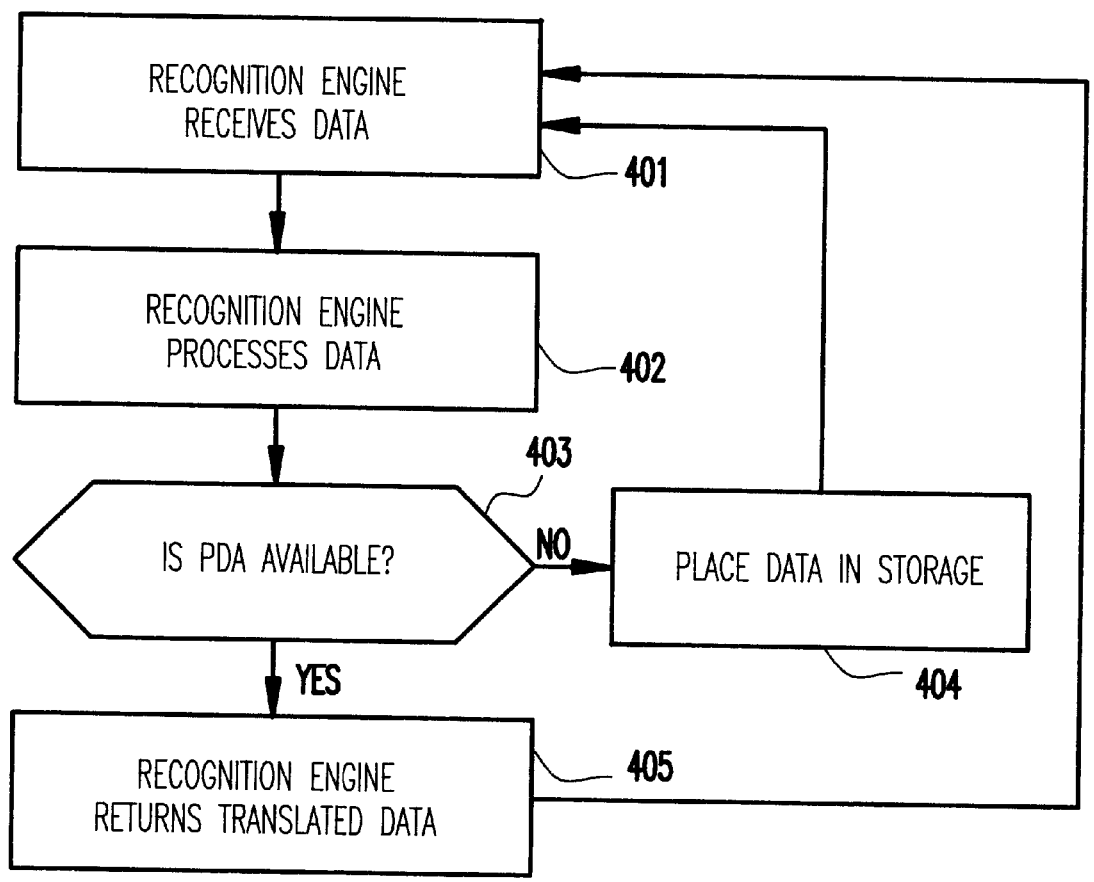
FIG. 4 is a flow chart showing the steps of the process flow for the recognition server.

FIG. 4 is a flow chart showing the steps of inventive process at the recognition server. The process flow starts with the step shown in block 401 with the recognition engine receiving data. Then, as shown in the step in block 402, the recognition engine processes the data. In the decision step shown in block 403, a determination is made as to whether the PDA is available. If the PDA is not available, the data is placed in storage, as shown in the step in block 404, and then the process loops back to block 401 to await additional data to be input to the recognition engine. If the PDA is available, the recognition engine returns the translated data, as shown in the step in block 405.

To illustrate the inventive method, let us review the use of the PDA with police at a crime scene. First, to make the PDA more useful, it is preprogrammed with the forms which police generally use and possibly a specific department uses to make reports of crime scenes. Typically, an officer will prepare reports at the end of a shift. Using the PDA, an officer can take notes answering questions on the form which he would normally fill out at the end of a shift. Depending of the preprogramming of the application, the officer could leave blanks and go to different sections of the form as he works. The officer may scroll back to complete blank sections as he works. The officer may then send the form by remote modem to the recognition engine for translation. The translated form may then be sent back to the officer's PDA for correction or storage.

One advantage of this approach is that the officer finishes his reports quickly and more accurately at the end of his shift. Another advantage is that the reports could be picked up by another individual prior to end of the officer's shift and reviewed for ties to other crimes or trends before the officer returns from his shift.

The recognition engine would have to be trained in a specific user's handwriting. The user may be requested to handwrite a known set of paragraphs for the search engine. These known paragraphs would help the search engine identify a user's letter shapes and styles.

If the recognition engine failed for any reason, including the user being just too messy with his or her handwriting, the PDA would store handwritten data, which could later be printed for the user's review.

In addition to quicker and more accurate translation of handwriting, the recognition engine allows the user to free up memory space in the PDA. Handwriting data generally takes up more memory than ASCII code or similarly computerized text. Once data has been translated, the user could store the handwritten data on the PDA, at a remote location, or delete the handwritten data altogether. Deleting the data or storing at a remote location frees memory in the PDA so that the user may use her PDA for other computation.

By increasing the flexibility of PDAs with the method described above, they would become increasingly useful to several sectors of business. For example, anyone who has to gather information on the scene to make a report at a later time, such as a police officer, insurance agent, physician, etc., could hand write the notes onto the PDA, have the data down loaded to an external device for processing, and then have the translated information returned back to the PDA for storage and follow up work. The newly released IBM WorkPad PDA would be an ideal candidate for such a system, but PDAs from other companies could benefit as well.

While the invention has been described in terms of preferred embodiments, those skilled in the art will recognize that the invention can be practiced with modification within the spirit and scope of the appended claims.

I claim:

1. A computer controlled method of operating a personal data assistant, comprising the steps of:
   accepting handwritten user input into said personal data assistant;
   storing said handwritten user input in said personal data assistant;
   sending said stored handwritten user input to a remote handwriting recognition engine;
   recognizing said handwritten user input in said remote handwriting recognition engine; and
   receiving translated information into said personal data assistant from said remote handwriting recognition engine, said translation information including said recognized handwritten user input.

2. A computer controlled method as in claim 1, wherein the steps of sending and receiving are performed synchronously.

3. A computer controlled method as in claim 1, where said steps of receiving translated information and displaying said recognized handwritten user input in a relevant field occurs independently of said accepting, determining, storing, and sending steps.

4. A computer controlled method as in claim 1, further comprising:
   connecting said personal data assistant and said handwriting recognition engine by a communications link.

5. A computer controlled method as in claim 4 wherein the communication link is a wireless link.

6. A computer controlled method as in claim 1, wherein said step of sending said stored handwritten user input is performed by a communications module built into an operating system of said personal data assistant.

7. A computer controlled method as in claim 1, wherein said step of sending said stored handwritten user input is performed by a communications module built into application code of said personal data assistant.

8. A computer controlled method as in claim 1, further comprising the steps of:
   receiving said handwritten user input in said handwritting recognition engine;
   performing said recognizing step;
   determining whether the personal data assistant is available to receive data;
   storing said recognized handwritten user input in a memory unit of said handwriting recognition engine if the personal data assistant is not available to receive data; and
   sending said recognized handwritten user input from said memory unit to the personal data assistant when said personal data assistant is determined to be available to receive data.

9. A computer controlled method as in claim 8, wherein said steps of receiving said handwritten user input and sending said recognized handwritten user input is performed by a communications module built into an operating system of said handwriting recognition engine.

10. A computer controlled method as in claim 8, wherein said steps of receiving said handwritten user input and sending said recognized handwritten user input is performed by a communications module built into application code of said handwriting recognition engine.

11. A personal data assistant which communicates with a remote handwriting recognition server, comprising:
    a user interface having means for accepting handwritten user input and a display for displaying data;
    storage means for storing said handwritten user input;
    a communications module which sends said handwritten user input to said handwriting recognition server and which receives recognized handwritten user input from the handwriting recognition server, said display of the user interface displaying said recognized handwritten user input.

12. A personal data assistant as in claim 11, wherein said communication module is built into operating system of the personal data assistant.

13. A personal assistant as in claim 11, wherein said communication module is built into application code of the personal data assistant.

14. A personal data assistant as in claim 11, wherein said communication module communicates with the remote recognition server via a wireless link.

15. A computer controlled method as in claim 1, further comprising:
    displaying said recognized handwritten user input in a relevant field on a screen of said personal data assistant.

16. A computer controlled method as in claim 1, wherein said accepting step includes:
    determining whether a minimum amount of object data corresponding to said handwritten user input has been received; and
    performing said storing step based on said determining step.

17. A computer controlled method as in claim 16, further comprising:
    making a request for further handwritten user input if said minimum amount of object has not been received.

18. A computer controlled method as in claim 1, further comprising:
    determining whether a record to which said handwritten user input belongs is active at a time when said recognized handwritten user input is received by said personal data assistant; and
    discarding said recognized handwritten user input if said record is not active.

19. A computer controlled method as in claim 18, further comprising:
    displaying said recognized handwritten user input in a relevant field on a screen of said personal data assistant if said record is active.

20. A computer controlled method as in claim 1, wherein said sending and receiving steps are performed asynchronously.

21. A computer controlled method as in claim 1, wherein said handwriting recognition engine is trained to recognize handwriting of a specific user.

22. A personal data assistant as in claim 11, further comprising:
    means for determining whether a minimum amount of object data corresponding to said handwritten user input has been input into said user interface, said storing means storing said handwritten user input when said determining means determines that said minimum amount of object data has been input.

23. A personal data assistant as in claim 22, further comprising:
    means for requesting further handwritten user input if said minimum amount of object data has not been input.

24. A personal data assistant as in claim 11, further comprising:
    means for displaying said recognized handwritten user input in a relevant field on a screen of said personal data assistant.

25. A personal data assistant as in claim 11, wherein said communication module communicates with the remote handwriting recognition server over a wired communication link.

26. A system for processing information, comprising:
    a user-operated electronic device which includes:
    (a) an interface which accepts handwritten information input by a user;
    (b) a storage unit which stores said handwritten information;
    (c) a display,
    (d) a communications module which outputs said handwritten information from said storage unit; and
    a handwriting recognition engine linked to said user-operated electronic device, said handwriting recognition engine including:
    (a) a communications module which receives said handwritten information output from the communications module in said user-operated electronic device;
    (b) a processor for recognizing said handwritten information, said communications module sending said recognized handwritten information back to the communications module in said user-operated electronic device.

27. A system as in claim 26, wherein said user-operated electronic device is a personal data assistant.

28. A system as in claim 26, wherein said user-operated electronic device includes means for displaying said recognized handwritten information in a relevant field of said display.

29. A system as in claim 26, wherein said user-operated electronic device includes:
    means for determining whether a minimum amount of handwritten information has been input by a user, said storage unit storing said handwritten information when said determining means determines that said minimum amount has been input.

30. A system as in claim 29, wherein said user-operated electronic device includes:
    means for requesting further handwritten information if said determining means determines that said minimum amount has not been input.

31. A system as in claim 26, wherein said user-operated electronic device includes:
    means for determining whether a record to which said recognized handwritten information belongs is active at a time when said recognized handwritten information is received from the communications module of said handwriting recognition engine; and
    means for discarding said recognized handwritten information if said record is not active.

32. A system as in claim 26, wherein said communications module in said user-operated electronic device and said communications module in said handwriting recognition engine communicate asynchronously.

33. A system as in claim 26, wherein said communications module in said user-operated electronic device and said communications module in said handwriting recognition engine communicate synchronously.

34. A system as in claim 26, wherein the processor in said handwriting recognition engine is trained to recognize handwriting of a specific user.

35. A system as in claim 26, wherein said communications module in said user-operated electronic device and said communications module in said handwriting recognition engine communicate over a wireless link.

36. A system as in claim 26, wherein said communications module in said user-operated electronic device and said communications module in said handwriting recognition engine communicate over a wired link.

37. A system as in claim 26, wherein said communications module in said user-operated electronic device is implemented in software which is included in an operating system of said user-operated electronic device.

38. A system as in claim 26, wherein said communications module in said user-operated electronic device is implemented in software which is included in application code of said user-operated electronic device.

39. A system as in claim 26, wherein said communications module in said handwriting recognition engine is implemented in software which is included in an operating system of said handwriting recognition engine.

40. A system as in claim 26, wherein said communications module in said handwriting recognition engine is implemented in software which is included in application code of said handwriting recognition engine.

41. A system as in claim 26, wherein said handwriting recognition engine includes:

means for determining whether said user-operated electronic device is available to receive data;

a storage unit which stores said recognized handwritten information when said determining means determines that said user-operated electronic device is not available to receive data, said communications module of said handwriting recognition engine sending said recognized handwritten information to said user-operated electronic device when said user-operated electronic device is determined to be available to receive data.

42. A computer controlled method as in claim 1, wherein handwriting recognition is performed exclusively in said remote handwriting recognition engine in said recognizing step.

43. A personal data assistant as in claim 11, wherein handwriting recognition is performed exclusively in said handwriting recognition server.

44. A system as in claim 26, wherein handwriting recognition is performed exclusively in said handwriting recognition engine linked to said user-operated electronic device.

\* \* \* \* \*